United States Patent [19]

Harris

[11] Patent Number: 4,482,039
[45] Date of Patent: Nov. 13, 1984

[54] PNEUMATIC QUICK DISCONNECT APPARATUS AND METHODS

[75] Inventor: Edward N. Harris, Huntington Beach, Calif.

[73] Assignee: The Garrett Corporation, Los Angeles, Calif.

[21] Appl. No.: 302,879

[22] Filed: Sep. 16, 1981

[51] Int. Cl.³ .................... F16D 25/061; F16D 43/28; F15B 15/22
[52] U.S. Cl. ........................... 192/67 R; 192/85 CA; 192/109 D; 192/109 F
[58] Field of Search ............. 192/56 F, 67 R, 85 CA, 192/109 D, 109 F; 92/85 B; 91/399

[56] References Cited

U.S. PATENT DOCUMENTS

| | | |
|---|---|---|
| 936,475 | 9/1963 | Black. |
| 966,601 | 8/1910 | Rosenfelt et al. .............. 91/399 X |
| 1,197,539 | 9/1916 | Plummer. |
| 2,388,857 | 11/1945 | Lindsley. |
| 2,489,258 | 11/1949 | Bebinger et al. .............. 192/67 R |
| 2,639,795 | 5/1953 | Munschauer .................. 192/67 R |
| 2,650,572 | 7/1949 | Amstutz ........................... 92/85 B |
| 2,708,993 | 5/1955 | Munschauer .................. 192/67 R |
| 2,742,991 | 4/1956 | Gilbert et al. ................. 192/67 R |
| 2,806,567 | 9/1957 | Bonquet. |
| 3,225,876 | 12/1965 | Dison. |
| 3,249,187 | 5/1966 | McDowall. |
| 3,303,756 | 12/1964 | Geeson .......................... 92/85 B |
| 3,425,527 | 2/1969 | Wolf. |
| 3,444,971 | 5/1969 | Davidson. |
| 3,559,538 | 12/1968 | Holder ............................. 92/85 B |
| 3,587,397 | 6/1971 | Hagopian ......................... 91/399 |
| 3,938,634 | 2/1976 | Frost .............................. 192/56 F |
| 3,963,107 | 6/1976 | Bolger .......................... 192/109 D |
| 3,972,557 | 8/1976 | Hudston ........................... 91/399 |
| 3,997,042 | 12/1976 | Langham. |
| 4,061,216 | 12/1977 | Sullivan et al. . |
| 4,269,293 | 5/1981 | Martin ............................... 192/35 |

Primary Examiner—Rodney H. Bonck
Assistant Examiner—David D. House
Attorney, Agent, or Firm—J. Richard Konneker; Albert J. Miller

[57] ABSTRACT

The spline-ended connecting shaft of an engine-accessory disconnect device has a radially outwardly projecting drive flange coaxially secured to an intermediate portion thereof. A housing captively retains the flange, permitting axial translation and rotation of the flange and shaft relative to the housing. A burst of compressed air injected into the housing is caused to exert sequentially opposite forces on the flange to rapidly initiate and terminate axial uncoupling motion of the shaft without imposing appreciable rigid impact force on the disconnect components. The shaft extends through openings in end walls of the housing so that it is freely rotatable and axially translatable relative to the housing without touching the surfaces of the housing openings.

10 Claims, 4 Drawing Figures

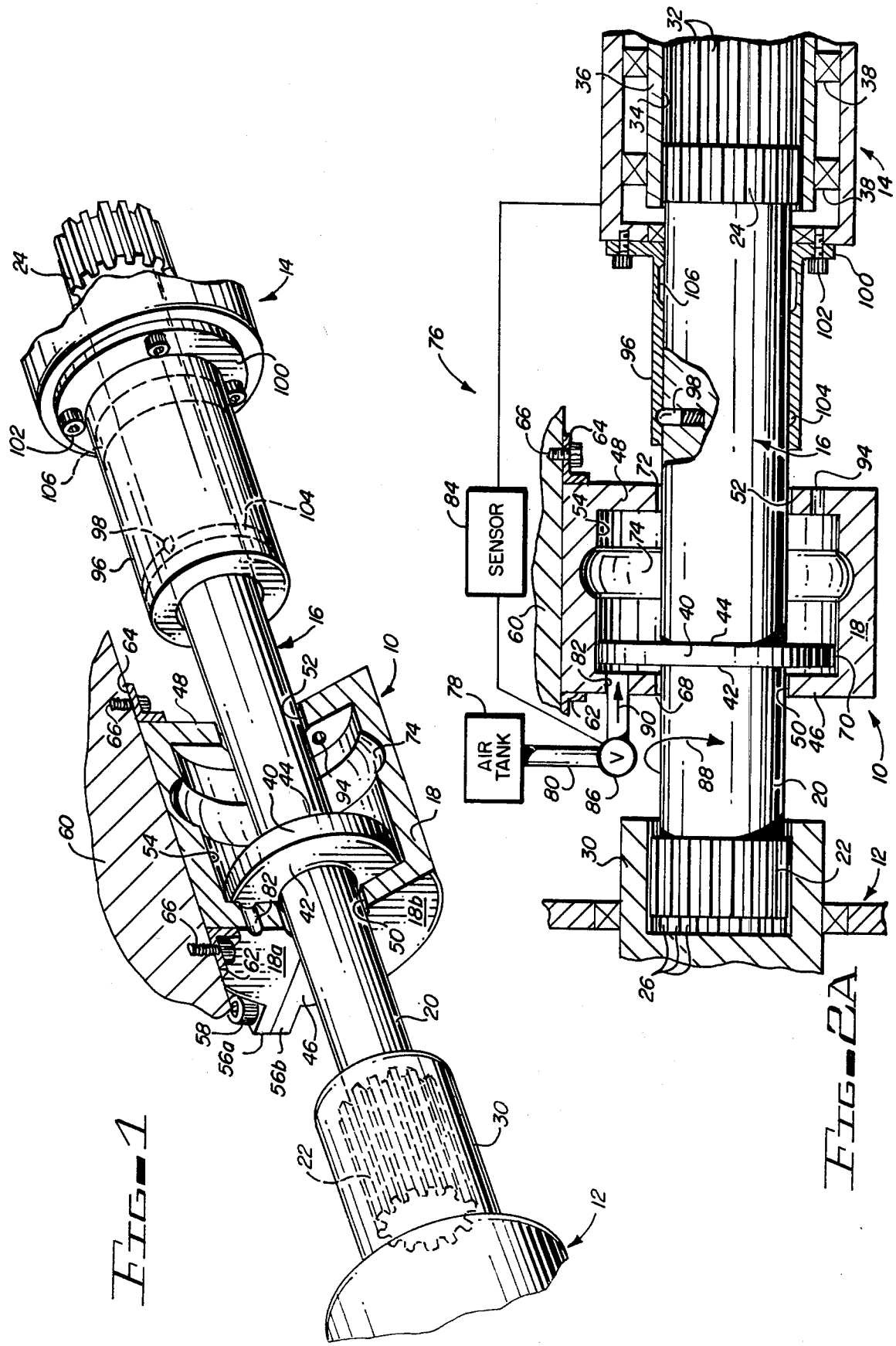

PNEUMATIC QUICK DISCONNECT APPARATUS AND METHODS

BACKGROUND OF THE INVENTION

The present invention relates generally to apparatus and methods for coupling driving and driven mechanisms during operation thereof, and more particularly provides pneumatically powered disconnect apparatus uniquely operable to very rapidly decouple an engine from a driven accessory without imposing appreciable rigid impact force upon the disconnect apparatus, the engine or the accessory.

A wide variety of disconnect devices have heretofore been employed to uncouple driving mechanisms, such as engines, from accessory devices which they customarily rotationally drive by means of a connecting shaft slidably coupled at its opposite ends to the engine and accessory. However, especially in high speed applications, conventional disconnect devices present one or more of several well known problems and disadvantages.

One such problem is a rather complex disconnect structure requiring the use of a fairly large number of high strength parts which must precisely cooperate to reliably effect the desired high speed disconnection of the shaft from one of the coupled mechanisms. The previously necessary structural complexity increases the manufacturing, assembly and maintenance time and cost of such disconnect devices, as well as increasing the number of potential failure points therein.

Another shortcoming inherent in conventional disconnect devices is the necessity of imposing rigid impact forces upon their components to initiate and terminate the uncoupling motion of the shaft which drivingly connects the engine and accessory. As an illustration of this "hardware impact" problem, in one very common disconnect system the connecting drive shaft is splined at its opposite ends and is slidably coupled to the engine and accessory so that axial movement of the shaft will cause its disconnection from one of them. A nut member having a radially outwardly projecting stop portion thereon is threadedly mounted on an intermediate portion of the shaft and rotates therewith under normal operating conditions.

To disconnect the shaft, a pin or other rigid element is moved into the path of the rotating stop portion. The stop portion slams into the pin and instantly stops the rotation of the nut member. The shaft, still rotationally driven by the engine, axially advances itself at a rapid rate relative to the stationary nut member to uncouple the engine and accessory. Subsequent to uncoupling, a portion of the shaft is driven against an abutment on the disconnect to abruptly terminate the shaft's axial motion.

These high speed disconnect component impacts limit the reusability of conventional disconnect apparatus. For example, in disconnects of the "drop pin" type just described, the pin is subjected in high speed applications to very high stress levels which can shear or deform it after only a few uses (or during its first use). After such damage the disconnect must be repaired or replaced.

In another common disconnect design, separate portions of the drive shaft are connected by a linking member purposely designed to be broken (by other components of the disconnect mechanism) when disconnection is desired. This, of course, negates the possibility of reusing or resetting the mechanism. It is only good for one use. Additionally, there is always the concern that the drive shaft's weak link will unexpectedly break of its own accord, leaving the engine-accessory system inoperative until the one-use disconnect system is rebuilt. In a great many applications, this situation is simply unacceptable.

It can be seen that there is a need for a reusable, high speed engine-accessory disconnect system which has a reduced number of components, operates without imposing appreciable impact forces on such components, and is easily and quickly resettable. Accordingly, it is an object of the present invention to provide such disconnect apparatus, and associated methods, and thereby eliminate or minimize above-mentioned and other problems and disadvantages associated with previous disconnect systems.

SUMMARY OF THE INVENTION

The present invention provides a reusable, gas operable accessory disconnect device that has only two components. In sharp contrast to the violently colliding parts in conventional disconnects, these two components interact during actuation of the device without appreciable rigid impact therebetween.

According to principles of the present invention, such disconnect device comprises connecting means for drivingly coupling a driving mechanism to a driven mechanism, the connecting means being translatable to uncouple the mechanism. Enveloping a portion of the connecting means are housing means for receiving a quantity of compressed gas from a source thereof and causing the received gas to exert sequentially opposite forces on the connecting means to rapidly effect and terminate translational uncoupling motion thereof.

BRIEF DESCRIPTION OF THE DRAWINGS

FIG. 1 is a partially cut-away perspective view of a portion of an accessory drive system including a gas operable accessory disconnect device embodying principles of the present invention and used to releasably couple and transmit rotational power between portions of an engine and a generator; and FIGS. 2A, 2B and 2C are partially diagrammatic, elevational and fragmented cross-sectional views of the accessory drive system, and an automatic actuation system therefor, and sequentially illustrates positions of the components of the disconnect device prior to, during, and subsequent to its actuation.

DETAILED DESCRIPTION

Figure 2B:
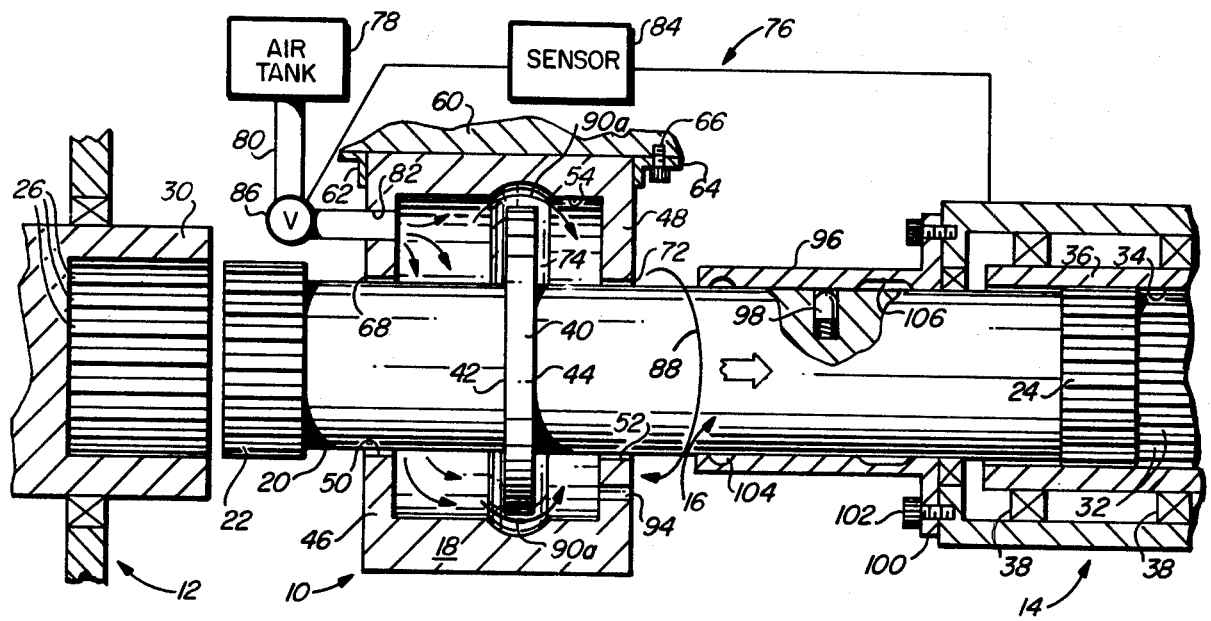

Illustrated in FIG. 1 is a fluid operable accessory disconnect device 10 which represents a preferred embodiment of the invention. This device is used to releasably couple a driving mechanism, such as an engine 12 (only a portion of which is shown), to a rotationally drivable mechanism or accessory, such as a generator 14 (only a portion of which is shown).

As subsequently described, disconnect 10 uniquely utilizes a single burst of pressurized fluid from a source thereof to rapidly uncouple the engine 12 from its driven generator 14 without imposing appreciable rigid impact force on disconnect 10, the engine 12 or the generator 14. This novel feature of the disconnect apparatus allows it to be reused a great many times without the necessity of adjusting, repairing, rebuilding or replacing it.

It should be noted at the outset that, in marked contrast to conventional accessory disconnects, the structure of disconnect 10 is quite uncomplicated. It has only two components—connecting means in the form of a shaft member 16, and housing means in the form of a can-shaped hollow body 18. As will be seen, only one of these two components, the shaft member 16, moves.

Shaft member 16 includes an elongated cylindrical shaft portion 20 having axially splined opposite end portions 22, 24. The splines of end portion 22 are axially slidably and releasably received in complementary interior axial grooves 26 (FIG. 2A) formed in the hollow outer end of a rotatable output shaft 30 of engine 12. The splines of the opposite shaft end portion 24 are axially slidably received in complementary axial grooves 32 formed in the interior surface of an opening 34 extending longitudinally through a cylindrical rotor member 36 which is rotatably supported within the generator 14 by bearings 38.

In its connecting position depicted in FIG. 2A, shaft member 16 engages and drivably couples the engine output shaft 30 and rotor 36 for conjoint rotation. Sufficient forward (i.e., rightward) axial movement of the shaft portion 20 withdraws it from the engine shaft 30 (see FIGS. 2B and 2C), thereby uncoupling the engine 12 from the generator 14. Because of the two described spline connections, this translational uncoupling motion of the shaft 20 may be effected during conjoint rotation of the engine and generator.

The connecting member 16 also includes a radially outwardly projecting drive flange 40 formed integrally with or otherwise fixedly secured to the shaft 20 between its splined opposite ends 22, 24. Flange 40, which defines a transversely enlarged portion of shaft 20, has a rearwardly facing end surface 42 and a forwardly facing end surface 44.

The cylindrical housing 18 coaxially circumscribes an intermediate longitudinal portion of connecting member 16, including flange 40, and permits translational and rotational motion of the connecting member relative to the housing. Flange 40 is captively retained within the housing interior between mutually spaced rear and front housing end walls 46, 48, the distance between such end walls being considerably greater than the width of the flange 40. Shaft 20 extends outwardly through circular openings 50, 52 respectively formed through end walls 46, 48 and having diameters slightly larger than the shaft diameter. The interior of housing 18 has a cylindrically shaped side surface 54 which extends axially between the housing end walls 46, 48. Interior surface 54 circumscribes flange 40 and is of a slightly larger diameter than the flange.

To facilitate assembly of the disconnect 10, the housing 18 may be conveniently formed in upper and lower sections 18a, 18b (FIG. 1) which are firmly intersecured as by flanges 56a, 56b extending along the lengths of the sections on opposite sides of their juncture and joined by suitable bolts 58 or other fastening means. The assembled housing 18 is securely anchored to a support 60 by means of, for example, mounting flanges 62, 64 respectively secured to the end walls 46, 48 and joined to the support by means of bolts 66 or other suitable fastening means. Support 60, which is schematically illustrated in the drawings, may be any suitably rigid stationary structure positioned between and adjacent the engine and generator, or a portion of one of them.

The anchoring of the housing 18 just described precludes its movement relative to the connecting member 16. Since the connecting member 16 is coaxial with the housing, there exist circumferential gaps 68, 70, 72 (FIG. 2A) between the shaft 20 and the housing end wall 46, the drive flange 40 and the interior housing surface 54, and the shaft 20 and the housing end wall 48, respectively. This prevents contact between the radially facing surfaces of the housing 18 and connecting member 16 during rotation and/or translation of the connecting member relative to the housing. The connecting member is thus freely translatable and rotatable relative to the fixed housing without contact between any of their radially facing surfaces—the only restraint imposed upon the connecting member by the housing being the captive retention of the drive flange 40 between the housing end walls 46, 48.

Within the housing 18 an annular channel 74 is formed completely around the interior housing surface 54 between the housing end walls 46, 48. Channel 74, which defines a transversely enlarged longitudinal portion of surface 54, is wider than the width of the drive flange 40 and is offset slightly toward the forward end wall 48 of housing 18.

Figure 2C:
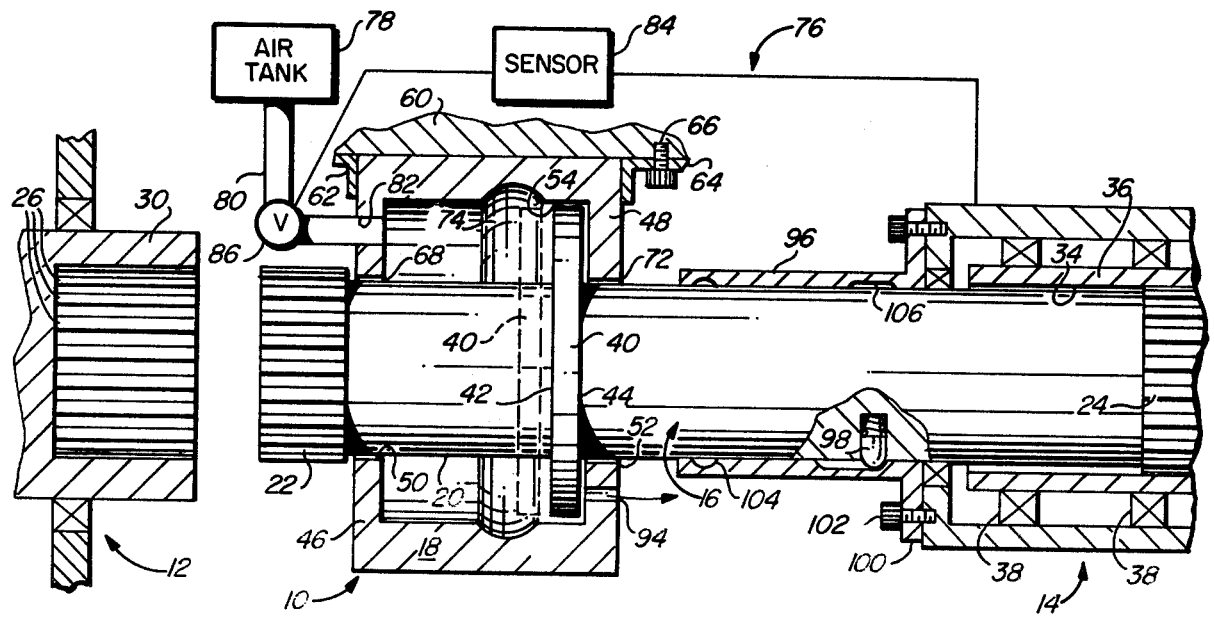

The disconnect 10, engine 12 and generator 14 partially define an accessory drive system 76, illustrated in FIGS. 2A through 2C, in which the rotatably driven generator is rapidly uncoupled from the engine by automatic activation of disconnect 10 in response to a sensed malfunction of the generator. This protects the generator from damage which might otherwise occur if it remained drivingly connected to the engine. The means for automatically activating disconnect 10 comprise a source of pressurized fluid, in the form of a small compressed air tank 78, coupled via a conduit 80 to an inlet 82 formed through housing end wall 46, and a sensor 84 operatively coupled between the generator 14 and a normally closed dump valve 86 positioned along conduit 80.

Referring to FIG. 2A, during normal operation of the accessory drive system 76, the connecting member 16 is coupled at its opposite ends to the engine 12 and generator 14, is rotationally driven by the engine as indicated by the arrow 88, and in turn rotationally drives the rotor 36. The drive flange 40, spinning freely within the housing 18, is positioned to the left of the interior housing channel 74 and closely adjacent the housing end wall 46.

In the event of a generator malfunction, sensor 84 opens the dump valve 86, thereby causing a burst of compressed air 90 to be injected, via conduit 80 and inlet opening 82, into the housing 18 between the rear surface 42 of flange 40 and the housing end wall 46. This injected burst of compressed air creates a reactive fluid thrust force between the drive flange 40 and the stationary housing end wall 46, driving the spinning shaft 20 rapidly forwardly as indicated by the large arrow on shaft 20 in FIG. 2B.

This rightward translational movement of the connecting member 16 withdraws the splined shaft end portion 22 from the engine shaft 30 while moving the opposite shaft end 24 further into the grooved rotor opening 34. When the shaft end 22 is fully withdrawn from the engine shaft 30, the engine 12 is fully disconnected from the generator 14.

As illustrated in FIG. 2B, at or about the time the rightwardly translating and rotating shaft 20 is fully withdrawn from the engine shaft 30, the drive flange 40 begins to forwardly traverse the interior housing channel 74. As it does so, a portion 90a of the injected air 90 forwardly bypasses the drive flange 40, around its periphery, through the channel 74.

The translational inertia of the connecting member 16 carries the drive flange 40 past the channel 74 toward the forward end wall 48 of the housing 18. As the drive flange 40 begins to move past the channel 74 (as indicated by the dashed line position of flange 40 in FIG. 2C) it substantially closes off the air bypass route defined by the channel 74, and traps and begins to compress the bypassed air 90a between the forward flange surface 44 and the forward housing end wall 48. As the flange 40 moves further rightwardly the compressed bypass air exerts a rearwardly directed fluid force on the drive flange 40, while being vented through a small vent opening 94 formed through the forward housing end wall 48, vent opening 94 being somewhat smaller than inlet opening 82.

Importantly, the trapped and compressed bypass air cushions and translationally decelerates the drive flange 40, and thus the entire connecting member 16, stopping it in the solid line position depicted in FIG. 2C and preventing the flange from appreciably impacting the forward housing end wall 48. The venting of the trapped and compressed air through the vent opening 94 functions to control the leftward fluid force of the trapped air on the connecting member to thereby prevent the connecting member from being "bounced" backwardly toward the engine shaft 30 and possibly reengaging it.

It can clearly be seen that the housing 18 and the drive flange 40 uniquely cooperate to utilize a single burst of pressurized fluid to exert sequential, oppositely directed fluid forces on the connecting member 16 (via the drive flange 40) to rapidly effect and terminate translational uncoupling motion thereof without imposing appreciable rigid impact force upon the disconnect 10, the engine 12, or the generator 14. To prevent impact between the connecting member 16 and the generator rotor 36 when the engine and generator are automatically uncoupled as described above, the grooved rotor opening 34 is made sufficiently long to prevent the shaft 20 from bottoming out against the rotor when the shaft is moved to its disconnected, stopped position indicated in FIG. 2C.

To releasably retain the connecting member 16 in its connected position (FIG. 2A) prior to disconnect activation, or in its axially stopped, terminal position (FIG. 2C) subsequent to disconnect activation, latch means are provided in the form of an elongated shaft collar 96, and a recessed, spring-loaded detent member 98 carried by shaft 20 rightwardly of housing 18. The collar 96 translationally and rotatably receives a portion of shaft 20, and has, at its inner end, a peripheral flange 100 which is secured to generator 14 by a series of suitable fasteners 102.

When the shaft 20 is in its connected position (FIG. 2A), detent 98 is spring-forced into a circumferential groove 104 formed completely around the interior surface of collar 96 adjacent its outer end. As the shaft 20 is moved through its disconnecting stroke (FIG. 2B), detent 98 is forced back into its recess until the shaft nearly reaches its stopped position (FIG. 2C), at which point the detent pops outwardly into a second, wider annular groove 106 formed in the interior surface of collar 96 adjacent its inner end. When it is desired to reset the disconnect 10, it is a simple matter to axially move the shaft end 22 back into the engine shaft 30 until the detent 98 clicks into the collar groove 104.

The illustrated and described reusable disconnect 10 provides a very desirable solution to many of the long-standing problems associated with conventional accessory disconnects. It has only two components, each of which is simple and relatively inexpensive to manufacture. The unique absence of rigid impact force during operation of the disconnect renders it extremely durable and reliable. Further, as described above, it is very easily and quickly resettable after each of its potentially great number of reuses.

A variety of modifications could be made to the disconnect 10 if desired. For example, means other than the illustrated flanges and fasteners 56, 58 could be employed to anchor the housing 18 to a suitable support. Moreover, differently configured latch means could be used. Additionally, while the illustrated interior housing surface channel 74 is annularly shaped and extends completely around the housing, the air bypass path which such channel defines could be formed in one or more circumferential segments if desired, or as one or more axially extending straight channels, among other possible configurations.

The foregoing detailed description is to be clearly understood as given by way of illustration and example only, the spirit and scope of this invention being limited solely by the appended claims.

What is claimed is:

1. An accessory drive system comprising:
    (a) a driving mechanism;
    (b) a drivable accessory; and
    (c) disconnect means for connecting and transmitting mechanical power between said driving mechanism and said accessory, said disconnect means being operable, without imposing appreciable rigid impact force thereon, to rapidly disconnect said driving mechanism and said accessory, and including:
        (1) connecting means carried by one of said driving mechanism and said accessory for translational movement relative thereto between a first position in which said connecting means engage the other of said driving mechanism and said accessory and couples said driving mechanism and said accessory, and a second position in which said driving mechanism and said accessory are uncoupled, and
        (2) means for utilizing a single quantity of compressed fluid to exert a fluid thrust force upon said connecting means to translationally drive the same from said first position toward said second position and to subsequently exert a fluid cushioning force upon the translating connecting means to stop the same in said second position, said connecting means including a shaft, and said fluid force exerting means including a housing enveloping a portion of said shaft and means for selectively injecting a burst of pressurized fluid into said housing,
        said fluid force exerting means further including cooperating means on said shaft and said housing for causing the injected fluid to exert both of said forces on said connecting means without creating frictional forces between said housing and any portion of said shaft during movement of said shaft between said first and second positions.

2. The accessory drive system of claim 1 wherein said cooperating means include a drive member carried by said shaft for movement therewith, said drive member being positioned within said housing and defining a transversely enlarged portion of said shaft, and a channel formed in the interior surface of said housing and positioned to be crossed by said drive member during movement of said connecting means from said first position toward said second position.

3. The accessory drive system of claim 1 further comprising latch means for releasably retaining said connecting means in said first position or second position to prevent undesired translational movement of said connecting means from either of said positions.

4. The accessory drive system of claim 1 wherein said fluid force exerting means include a housing circumscribing a portion of said connecting means, a source of pressurized fluid communicating through a flow path into the interior of said housing, a normally closed valve operatively positioned in said flow path, and sensing means coupled between said valve and said accessory for sensing a malfunction of said accessory and responsively opening said valve.

5. Fluid operable disconnect apparatus comprising:
   (a) hollow housing means having:
      (1) an axis,
      (2) first and second end walls spaced apart along said axis,
      (3) a circular cylindrical interior surface extending longitudinally between said end walls and being centered about said axis, said interior surface having a diameter and a radially enlarged portion positioned between said end walls;
      (4) first and second openings extending inwardly through said first end wall to the interior of said housing means, and
      (5) third and fourth openings extending inwardly through said second end wall to the interior of said housing means, said axis extending through said first and third openings;
   (b) a shaft extending through said first and third housing means openings and being freely rotatable and axially translatable relative to said housing without touching the surfaces of said first and third housing means openings, said shaft having opposite end portions extending outwardly from said housing and being adapted to axially releasably couple said shaft between an engine and a driven accessory for transfer of rotational power therebetween; and
   (c) a drive flange coaxially secured to a longitudinally intermediate portion of said shaft for movement therewith, said drive flange being captively retained within said housing means and having:
      (1) a diameter larger than the shaft diameter and sufficiently smaller than said diameter of said housing means inner surface so that said flange is freely rotatable and axially translatable relative to said housing means without touching said circular cylindrical surface thereof, and
      (2) a width smaller than the axial extent of said radially enlarged portion of said housing means inner surface,
      whereby, when said flange is positioned between said first end wall and said radially enlarged inner surface portion, a pressurized fluid forced into said second housing means opening sequentially drives said flange toward said second end wall, bypasses the moving flange through said radially enlarged inner surface portion, is trapped between the moving flange and said second end wall, and is compressed by and decelerates the moving flange while being vented from said housing means through said fourth opening therein.

6. The disconnect apparatus of claim 5 wherein said radially enlarged interior surface portion is offset longitudinally toward said second end wall of said housing.

7. The disconnect apparatus of claim 5 wherein the outer ends of said shaft are axially splined.

8. The disconnect apparatus of claim 5 wherein said first and third housing openings have a minimum radial dimension larger than the diameter of said shaft, whereby said shaft may be positioned relative to said housing to permit translation and rotation of said shaft relative thereto without radial contact between said housing and said shaft or said flange.

9. The disconnect apparatus of claim 5 wherein said radially enlarged portion of said interior surface of said housing defines a circumferential channel at least partially circumscribing said shaft.

10. The disconnect apparatus of claim 9 wherein said channel completely circumscribes said shaft.

* * * * *